United States Patent [19]

Beck et al.

[11] 4,427,476

[45] Jan. 24, 1984

[54] METHOD OF UTILIZING RECIPROCATING CLAMP APPARATUS TO THERMOFORM PLASTIC CONTAINERS

[75] Inventors: Martin H. Beck, Brookline; Suppayan M. Krishnakumar; Ieuan L. Harry, both of Nashua, all of N.H.

[73] Assignee: The Continental Group, Inc., Stamford, Conn.

[21] Appl. No.: 315,842

[22] Filed: Oct. 28, 1981

[51] Int. Cl.³ .................... B32B 1/10; B29C 17/04
[52] U.S. Cl. .................................. 156/199; 156/245; 156/292; 264/512; 264/522; 264/544; 264/545; 264/549; 264/551; 264/553; 264/248; 264/280; 264/296; 264/297; 425/341; 425/342.1
[58] Field of Search ............... 264/512, 522, 544, 545, 264/549, 550, 551, 553, 248, 296, 297, 280; 425/341, 342.1; 156/245, 199, 214, 292

[56] References Cited

U.S. PATENT DOCUMENTS

| | | | |
|---|---|---|---|
| 3,040,380 | 6/1962 | Alosky | 425/541 X |
| 3,063,092 | 11/1962 | Fischer | 425/541 X |
| 3,078,508 | 2/1963 | Martin, Jr. | 425/541 X |
| 3,450,807 | 6/1969 | Cheney | 264/550 X |
| 3,466,355 | 9/1969 | Kostur | 264/549 X |
| 3,504,070 | 3/1970 | Zaharski | 264/549 |
| 3,632,252 | 1/1972 | Amberg et al. | 264/522 X |
| 3,767,501 | 10/1973 | Thiel | 156/245 X |
| 3,837,517 | 9/1974 | Held, Jr. | 264/553 X |
| 3,880,565 | 4/1975 | Barr et al. | 425/450.1 X |

FOREIGN PATENT DOCUMENTS 962020  2/1975  Canada ................. 264/553
1166775  1/1960  France ................. 264/545

Primary Examiner—Jan H. Silbaugh
Attorney, Agent, or Firm—Charles E. Brown

[57] ABSTRACT

This relates to the forming of containers and like hollow articles from sheets or webs of thermoplastic material. Two webs or sheets are simultaneously acted upon by way of a forming apparatus which includes a reciprocating clamp first cooperable with one outer platen and then the other in sequence wherein, while a first web or sheet is being formed within a plurality of mold cavities to define a plurality of hollow articles such as containers, the other sheet or web may be stripped from its respective mold set and a new sheet or a new portion of a sheet or web may be advanced into position for molding. The forming apparatus may be constructed in a manner wherein the web portions which are to be formed may be billowed away from the mold cavities as an initial step in the stretching and orientation of the thermoplastic material. The thermoplastic material may be heated to the desired forming temperature using seprate sets of rf electrodes so that only those portions of the thermoplastic material which are to be formed need be heated. Two sets of containers of different sizes may be formed from the webs or sheets, and then internested to form double wall containers wherein the walls may be formed of different materials and wherein the outer material may be a barrier material, or wherein the walls of the containers are spaced apart to form an insulated container. This abstract forms no part of the specification of this application and is not to be construed as limiting the claims of the application.

6 Claims, 15 Drawing Figures

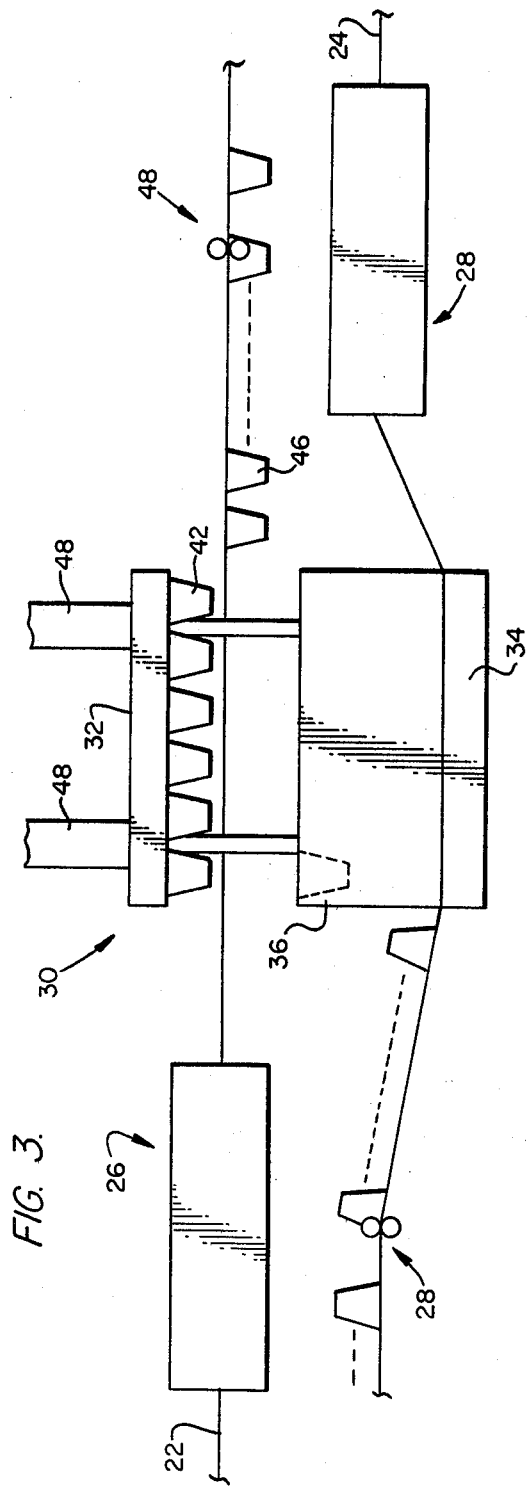
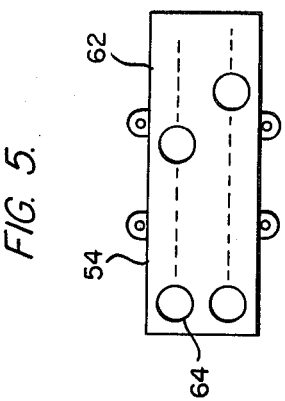
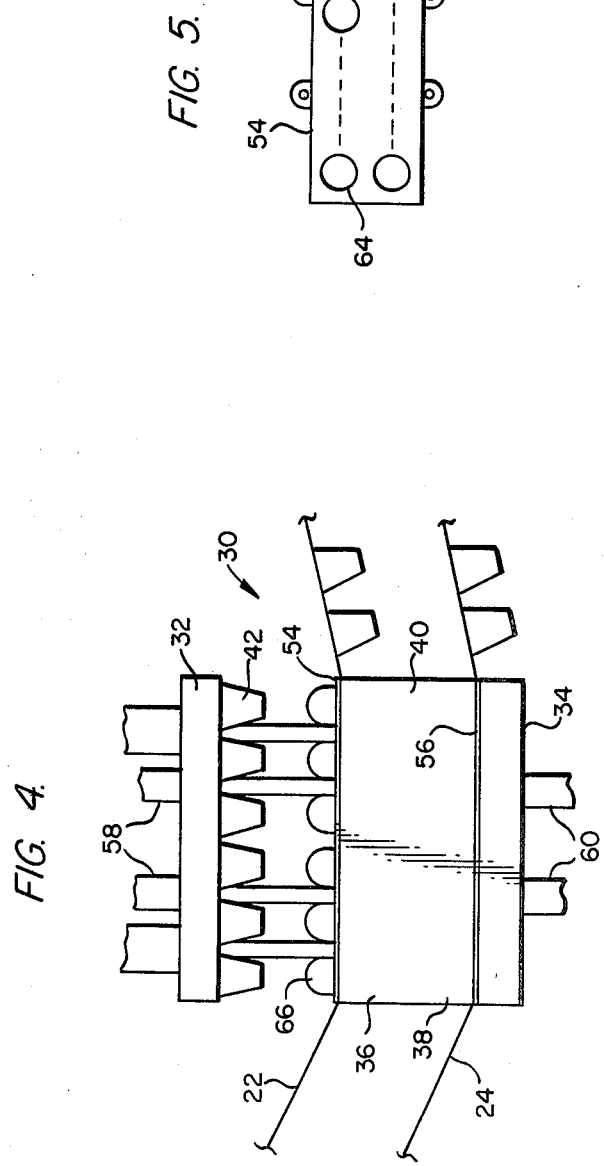

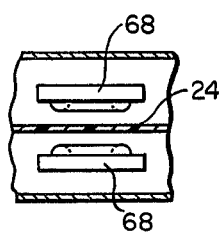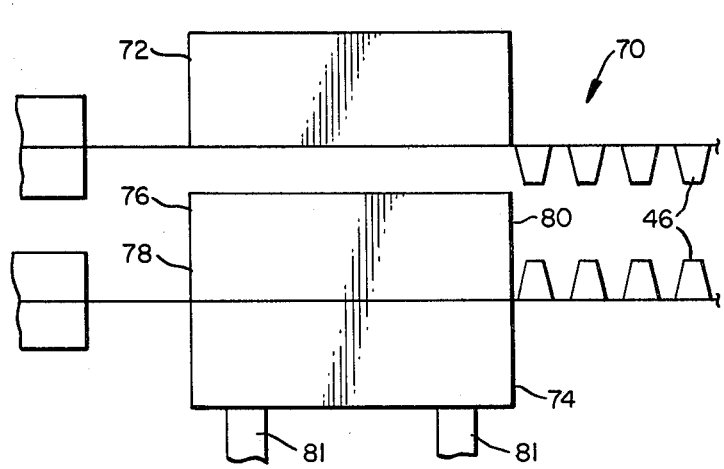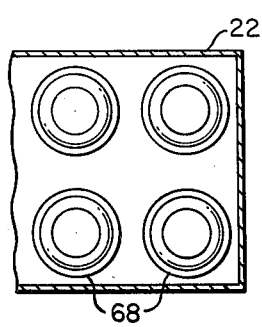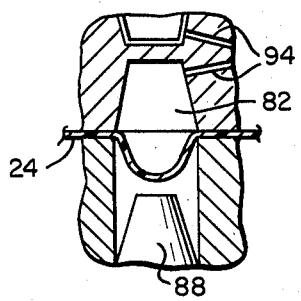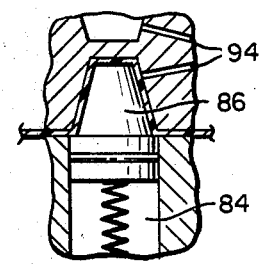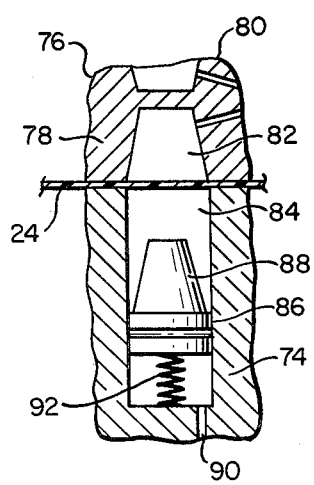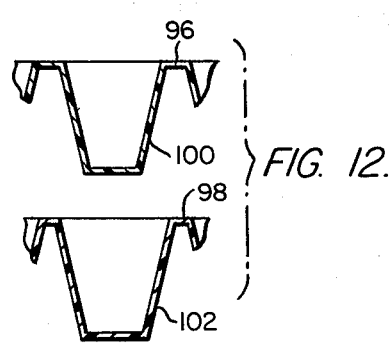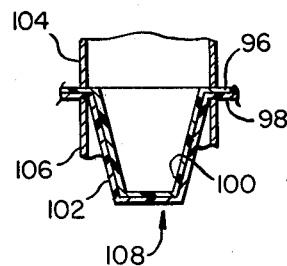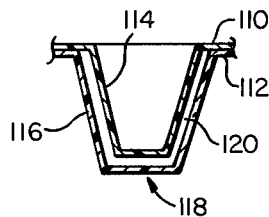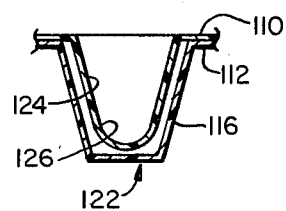

METHOD OF UTILIZING RECIPROCATING CLAMP APPARATUS TO THERMOFORM PLASTIC CONTAINERS

This invention relates in general to new and useful improvements in apparatus for and method of making containers from a sheet or web wherein the containers are formed by a thermoforming operation and plural containers, such as twelve or more containers, are formed in each operation.

In accordance with this invention, sheets or webs of thermoplastic material which may be conveniently thermoformed within a mold are fed in two lines, first through ovens or like heating means to raise the temperature of the material to a thermoforming and orientation temperature and then between a reciprocating clamp assembly which functions simultaneously to form one sheet or web into a plurality of containers while permitting the stripping of the other sheet or web being formed therein from the molding apparatus and the feeding of a new sheet or web portion into alignment with the molding apparatus so as to provide for maximum efficiency with the molding apparatus.

Another feature of the invention is to provide for localized heating only of the areas of the sheets or webs from which containers are to be formed whereby the remainder of the sheet or web will retain substantially its original strength and may be utilized to convey the heated areas without undue sagging or tensioning of the sheet or web.

In accordance with this invention, the molding apparatus may include two outside platens, which may be fixed, and two inside platens which are mounted for movement to present first one inside platen into cooperating relationship with a respective outside platen and then moving the other of the inside platens into cooperating relationship with its respective outside platen while separating the one inside platen from its respective outside platen. One platen of each set will have formed therein or will carry mold cavities, and the other platen will be provided with projections in the form of plungers for stretching and shaping drawn sheet or web material into respective mold cavities.

In accordance with this invention, it is proposed to billow the plastic material which is to be formed in a direction away from the mold cavity before the same material is pushed into the mold cavity by an associated plunger. To this end there may be provided a separate clamp associated with each set of mold cavities for clamping the material against the mold unit around each mold cavity, after which a billowing gas may be introduced into each mold cavity to billow the material aligned with each mold cavity through an associated opening in the clamp.

In another form of the invention, the plungers are mounted within cylinders within their respective cavities and are initially retracted within the cylinders when the material is clamped between the mold unit and the respective platen carrying the plungers. A billowing gas is introduced into each mold cavity as previously described to billow the aligned portions of the material into the cylinders. Each plunger includes a piston portion which is then actuated to move the billowed portion associated therewith into the aligned mold cavity.

In accordance with this invention, it is proposed to use radio frequency heating means which, when aligned with a stationary portion of the sheet or web, will heat only that portion of the sheet or web which is to be formed. Preferably, the rf heating means will be in the form of a plurality of electrodes which are configurated not only to heat only specific areas of the sheet or web, but also to vary the temperature of the heated material within such area.

It is also proposed to form the two sets of containers carried by the separate lines of sheets or webs such that one container will internest within the other container. The internested containers may have a tight fit and thus provide a single container of a two-ply construction, or the inner container may be much smaller than the outer container so as to leave between the two containers an air gap which provides for an insulated container construction. If desired, the inner container of the latter construction may have a generally hemispheric bottom configuration so as to withstand high internal pressures.

With the above and other objects in view that will hereinafter appear, the nature of the invention will be more clearly understood by reference to the following detailed description, the appended claims, and the several views illustrated in the accompanying drawings.

IN THE DRAWINGS

FIG. 3 is a schematic elevational view similar to FIG. 1, but showing a reverse direction of feeding.

FIG. 4 is a fragmentary schematic elevational view of a modified clamp assembly utilizing a material clamp which permits billowing of the sheet or web portions which are to be formed.

FIG. 5 is a plan view of the sheet material clamp.

FIG. 6 is an enlarged fragmentary sectional view taken generally along the line 6—6 of FIG. 1, and shows the typical configuration of an rf heater within the oven.

FIG. 7 is an enlarged fragmentary horizontal sectional view taken generally along the line 7—7 of FIG. 1, and shows generally the arrangement of electrodes within the oven.

FIG. 8 is a schematic elevational view similar to FIG. 1, and shows a modified form of clamp assembly.

FIG. 9 is an enlarged fragmentary vertical sectional view taken through the upper part of the clamp assembly of FIG. 8, and shows the sheet or web when initially clamped.

FIG. 10 is a fragmentary sectional view similar to FIG. 9, and shows that portion of the material aligned with the mold cavity billowed into an adjacent cylinder.

FIG. 11 is a fragmentary sectional view similar to FIG. 9, and shows the plunger advanced to move the billowed material into the mold cavity and effect forming thereof.

FIG. 12 is a schematic sectional view taken through two adjacent sheets or webs having formed therefrom cooperating container components.

FIG. 13 is a fragmentary sectional view showing the sheets or webs of FIG. 12 moved together into face-to-face relation, the containers internested, and means for sealing the container flanges together.

FIG. 14 is a sectional view through a container similar to that of FIG. 13 and formed in the same manner, but wherein the containers are spaced except for their flanges so as to form a single insulated container.

FIG. 15 is a sectional view similar to FIG. 14, and shows a modified form of container construction.

Figure 1:
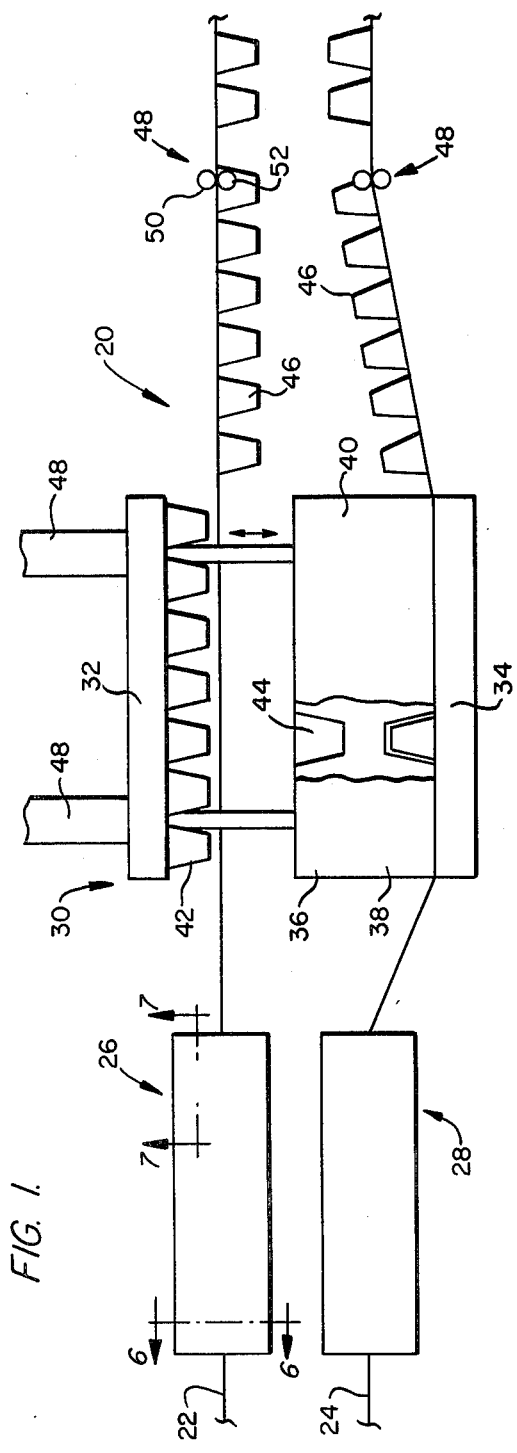
FIG. 1 is a schematic elevational view of a form of apparatus in accordance with the invention.
Figure 2:
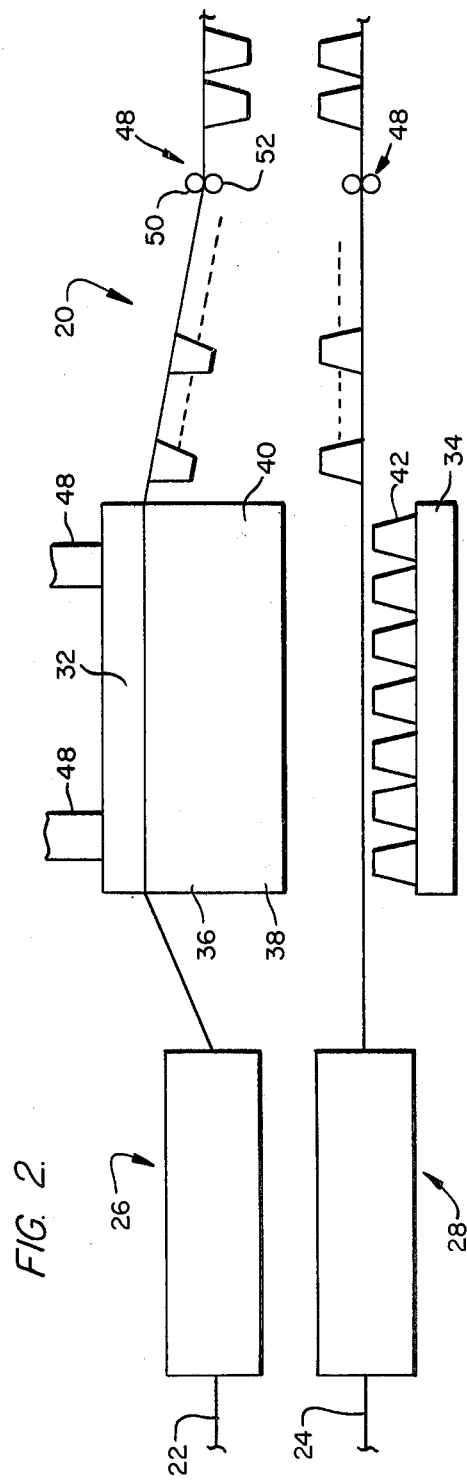
FIG. 2 is a schematic elevational view similar to FIG. 1, and shows the apparatus in a second stage of operation.

Referring now to the drawings in detail, reference is first made to FIGS. 1 and 2 wherein a first forming apparatus is illustrated and is identified by the numeral 20. The forming apparatus 20 includes means for providing two paths of sheets or webs, with one web being identified by the numeral 22 and the other by the numeral 24. At this time it is pointed out that, as far as this invention is concerned, the material which is to be formed may either be supplied in roll form or may be extrusion formed immediately in advance of its use, or may be supplied as individual sheets of a length wherein a single sheet can be formed as a unit. However, for simplicity of description, the material which is to be formed will be described as being in roll form as illustrated in the drawings.

The webs 22, 24 pass through heating units 26, 28, respectively, wherein the thermoplastic material of the webs is heated to a selected forming temperature. With respect to what is a proper forming temperature, it is to be understood that thermoplastic material is to be heated to a thermoforming temperature, although it is preferred that the temperature be maintained at a temperature wherein the thermoplastic material may be biaxially oriented as it is being formed as opposed to being at a higher temperature wherein it flows as opposed to being stretched.

It is also pointed out here that the heating units 26, 28 may be in the form of simple ovens wherein the webs are heated throughout to the selected forming temperature, or the heating units may be in the form of radio frequency heaters which provide for the selected heating of only specific portions of the web. It is also feasible within the ambits of this invention to overall heat the webs to a temperature less than forming temperature and then concentrate the heating on those areas thereof which are to be formed, not being heated or heated to a much lower temperature than the forming temperature so that the webs will maintain sufficient strength to permit the controlled feeding of the webs without the webs sagging or stretching during the feeding operation.

Most specifically, in accordance with this invention, there is provided a forming unit 30 which is of the reciprocating clamp type. The forming unit 30 includes a pair of spaced outer platens 32, 34 and a pair of inner platens 36, 38 which are united to form a single reciprocating clamp member 40. In the illustrated arrangement of FIG. 1, the platen 32 cooperates with the platen 36 while the platen 34 cooperates with the platen 38. It is also to be noted here that the platens 32, 34 are preferably fixed although it is feasible, in accordance with this invention, to move the platens 32, 34 simultaneously with the movement of the clamp 40.

In the illustrated embodiment, the platens 32, 34 carry a plurality of plungers 42 while the platens 36, 38 carry molds defining mold cavities 44. In the arrangement illustrated there are two rows of plungers 42 and thus at each operation of the forming apparatus 30, twelve containers or like elements will be simultaneously formed, and during a complete operation cycle, twenty-four such containers will be formed. It is, however, feasible to increase both the numbers of plungers in a row and the number of rows. Further, there may be more rows than number of plungers in a row.

It is also pointed out here that while in the illustrated embodiment of the invention the plungers 32 cooperate with the mold cavities 44 to define the formed article, such as a container 46, the plungers 32 may be of a size much less than the size of the mold cavity 44 and the final forming of the container 46 may be by internal gas pressure together with or separate from a vacuum drawn within the mold cavity.

It is to be understood that the clamp 40 will be suitably mounted for guided movement along a predetermined path and it is reciprocated by means of double acting fluid cylinders 48 of which only two are illustrated, but wherein preferably there are four cylinders.

In FIG. 1, the clamp 40 is positioned with the platens 34, 38 in cooperation for the forming of the associated web 24, while the platens 32, 34 are in the open state. Further, the forming of containers 46 within the mold cavities 44 of the platen 38 are in the final stages of forming and the web 22 has advanced so as to move the last formed containers 46 out of alignment with the forming apparatus and to move unformed portions of the web 22 into alignment with the platens 32, 36.

It is also to be noted that when the clamp 40 moves the platen 38 into association with the platen 34, the web 24 is moved out of alignment from its normal plane. However, when the clamp 40 is shifted as is shown in FIG. 2, to the position wherein the platens 32 and 36 cooperate and the web 24 is again advanced, the web 24 will return to its path of movement, and this movement will assist in the stripping of the containers 46 from the plungers 42 and from the mold cavities 44.

At this time it is pointed out that for descriptive purposes the forming unit 30 includes two sets of mold units and each mold unit includes a fixed or outer platen and an inner or movable platen, and that one of the platens of each set includes plungers and the other of the platens of each set is in the form of molds which define mold cavities.

It is also to be understood that the webs or sheets are intermittently advanced by a suitable feed mechanism, generally identified by the numeral 48. There is a separate feed mechanism for each of the webs, and preferably each feed mechanism 48 includes a pair of cooperating feed rolls 50, 52 which may include a feed roll having projecting pins which will project through the respective web and form an interlock therewith to assure a positive driving or feeding of each web.

Although the time required to effect each step in the operation of the forming apparatus 30 may vary, typically a complete forming cycle may require a time on the order of 4 seconds, one second for forming the web 24, one second for shifting the clamp 40, one second for forming the web 22, and finally one second for shifting the clamp 40 back to its original position.

Referring now to FIG. 3, it will be seen that while the forming apparatus 30 remains the same, the direction of movement of the web 24 has been reversed so that the heating units 26 and 28 are now on the opposite sides of the forming apparatus 30 and the webs 22, 24 now move in opposite directions. Of course, the feed mechanism 48 for the two webs is disposed on opposite sides of the forming apparatus or unit 30.

Reference is now made to FIG. 4 wherein the forming apparatus 30 is modified to include a pair of web clamp members 54, 56. The web clamp member 54 is carried, for example, by fluid cylinders 58 carried by the platen 32 while the web clamp member 56 is carried by fluid cylinders 60 carried by the platen 34.

When the clamp 40 is shifted into cooperation with the platen 34, as illustrated in FIG. 4, the web 22 is advanced relative to the forming apparatus 30 and then the cylinders 58 are actuated to move the web clamp member 54 into cooperation with the platen 38. The web clamp member 54, as is shown in FIG. 5, is in the form of a plate 62 having a plurality of openings 64 formed therein. The openings 64 are aligned with the mold cavities 34 and are of a selected diameter. With the web 22 clamped between the web clamp member 54 and the platen 36, gas (air) under pressure is introduced into the mold cavity 44 so as to effect a billowing of the clamped material aligned with the openings 64 to produce a billowed portion 66 for each of the mold cavities 44. It is to be understood that the billowing of the web 22 is effected at the time while the web 24 is being formed into a plurality of containers or like articles 46. When the forming of the web 24 is completed, the clamp 40 shifts to move the platen 36 into cooperation with the plungers 42 wherein the plungers 42 first move the billowed portions 66 into the aligned mold cavities 44, after which the plungers 42 cooperate with the mold cavities 44 to effect the forming of the containers 46.

It is to be understood that the billowing of the portions of the webs 22, 24 serves to effect a stretching and biaxial orientation of the web material and this enhances the biaxial orientation of the thermoplastic material of the webs 22, 24 in the forming of the containers 46.

Reference is now made to FIGS. 6 and 7 wherein a typical construction for the heater units 26, 28 is illustrated. Preferably, individual portions of the webs 22, 24 are to be heated to forming temperature only in those areas of the webs which are to be formed in the forming of the containers or the like 46. To this end, there are pairs of electrodes 68 which include an electrode on each side of the associated web, for example the web 22. There will, of course, be one pair of electrodes 68 for each mold cavity 44 of a mold set. The electrodes 68 are connected to a source of radio frequency energy and there is set up between the opposed electrodes 68 a high frequency field which serves to effect a heating of the portion of the web lying within that field. It is further to be understood that the configuration of the electrodes 68 may be varied so as to provide a greater concentration of the radio frequency field and thus a higher temperature in certain of the areas of the web wherein greater stretching is required. Inasmuch as the electrode configuration may be greatly varied, only a schematic electrode configuration is illustrated.

Reference is now made to FIGS. 8–11 wherein a modified form of forming unit, generally identified by the numeral 70, is illustrated. The forming unit 70 includes outer and preferably fixed platens 72, 74 and movable inner platens 76, 78, joined together to define a clamp 80. The clamp 80 is reciprocated first to position the platen 76 for cooperation with the platen 72, and then to shift the clamp 80 to move the platen 78 into cooperating engagement with the platen 74. Suitable double acting fluid cylinders 81 are utilized to shift and position the clamp 80.

The forming unit 70 differs from the forming unit 20 so that the platens 76, 78 which form the clamp 80 define a plurality of oppositely opening molds which are in the form of a plurality of mold cavities 82. Each of the platens 72, 74, as is shown with respect to the platens 74, is provided with a cylinder 84 aligned with each mold cavity 82, as is shown in FIG. 9. In each cylinder 84 is a piston 86 which carries a plunger 88. The piston 86 is suitably sealed relative to the cylinder 84 and is advanced toward the respective inner platen, for example the platen 78, by means of fluid introduced into the cylinder 84 behind the piston 86 through a fluid passage 90. Suitable return means are provided to retract the piston 86 and plunger 88 and for the purpose of simplicity the return means has been illustrated as being in the form of a tension spring 92.

With the web 24 advanced relative to the platens 78, 74, the clamp 80 is shifted so as to clamp the web 24 between the platens 74, 78, as shown in FIG. 9. At this time the piston 86 and the plunger 88 are retracted.

Each of the mold cavities 82 has in communication therewith a plurality of passages 94 of which only a single passage has been illustrated. The passages 94 will be arranged around the mold cavity so as to permit the selective venting of the mold cavity 82 or the pressurization thereof.

After the web 24 has been clamped, gas under pressure is introduced into the mold cavities 82 of the platen 78 and the clamped portions of the web 24 are billowed into the respective cylinders 84, as shown in FIG. 10. This effects a prestretching and orientation of the clamped web portion.

After the clamped web portions have been billowed, the passages 94 are disconnected from a supplying gas under pressure and are opened to atmosphere, at which time the plungers 88 are advanced to move the billowed portions of the web 24 into the mold cavities 82, as shown in FIG. 11. As the plunger 86 moves into a respective mold cavity 82, the respective passage 94 may be coupled to a vacuum source so that the web material may be in part vacuum formed to the configuration of the mold cavity 82. It is also feasible to introduce a billowing gas through the plunger 86 into the interior of the material formed being formed so as to effect a blow molding.

It is to be understood that in the opening of the mold set the clamp 80 will move away from the platen 74 and at the same time or shortly thereafter the plunger 86 will be retracted within its respective cylinder 84 to effect a stripping of both the mold of which the platen 78 is a part and the plunger 86 from the formed container 46.

Referring now to FIG. 12, it will be seen that there is illustrated two webs 96, 98 which have been advanced in the manner described with respect to the webs 22, 24 in the manner shown in FIG. 1 or FIG. 8, but wherein the two mold sets are different so that containers 100 formed from the web 96 are of a size to nest within containers 102 formed from the web 98. The containers 100, 102 carried by the webs 96, 98 are in alignment with one another and, as the webs 96, 98 are moved together as shown in FIG. 13, the container 100 nests within the container 102 to form a single double layer container. Thereafter, those portions of the webs 96, 98 surrounding the containers 100, 102 may be suitably secured together such as by way of an adhesive, heating, sonic agitation and the like. Suitable combined clamping and joining means 104, 106 are illustrated in FIG. 13.

It is to be understood that only those portions of the webs 96, 98 which define a flange about an open mouth of the two layer container, identified by the numeral 108, are joined together so that when each container 108 is blanked from the webs 96, 98, the scrap material of these two webs is not joined together and thus may be individually salvaged. This arrangement is readily adapted to the webs 96, 98 being formed of different materials. For example, the web 96 may be formed of a material which is suitable for the reception of a food product or beverage, such as PET, and the web 98 may be formed of a suitable barrier material, such as Saran.

Referring now to FIG. 14, it will be seen that there is illustrated a pair of webs 110, 112, which have separately formed therefrom containers 114, 116, respectively. The containers 114, 116 will be formed in the manner generally shown in FIGS. 1 and 8, and then the webs 110, 112 will be moved together with the portions of the webs surrounding the mouth of the container 116 being suitably bonded together as described with respect to the container 108 of FIG. 13. It will be seen that when the joined together portions of the webs 110, 112 are blanked from these webs, the net result is an insulated container generally identified by the numeral 118 wherein the containers 114, 116, except at their joined flanges, are separated by an air space 120.

In FIG. 15 there is illustrated a still further form of container generally identified by the numeral 122. The container 122 may be formed from the webs 110, 112 and the web 112 may be formed to define the container 116 of FIG. 14. However, the container formed from the web 110, which container is identified by the numeral 124, may have a hemispherical bottom 126 which will facilitate the container 124 having the required strength to define a container for liquids, such as beverages, packaged under internal pressure.

Although only preferred embodiments of the forming apparatus and the utilization thereof, as well as the resultant products, have been specifically illustrated and described, it is to be understood that minor variations may be made in these features without departing from the spirit and scope of the invention as defined by the appended claims.

We claim:

1. A method of forming containers comprising the steps of providing two sets of mold units with each set including a cavity unit and a plunger unit, each of said cavity units having a cavity of a preselected shape and each of said plunger units carrying a plunger of a shape substantially corresponding to the shape of said cavity, mounting one unit of each mold unit set for movement in unison wherein, when one of said mold unit sets is closed, the other of said mold unit sets is open, providing two continuous webs having at least portions thereof heated to forming temperature, feeding said heated webs between units of respective ones of said mold unit sets, and while forming containers from and integral with one of said webs between closed units of one of said mold unit sets advancing the other of said webs to remove newly formed containers from the other of said mold unit sets and advancing a heated new portion of said other web into alignment with said other mold unit set.

2. A method according to claim 1 wherein said webs are movable in preselected planes, and in the forming of containers said webs are displaced from said planes with said webs returning to said planes after each forming of containers to automatically strip newly formed containers from both said cavities and said plungers.

3. A method according to claim 1 wherein each newly advanced web portion is clamped to a cavity unit of a respective mold unit set while said respective mold unit set is opening, and a gas under pressure is directed against each clamped web portion aligned with a cavity to billow each clamped web portion away from its respective mold cavity to prestretch said web portions.

4. A method according to claim 1 wherein only selected portions of said webs are heated to forming temperature with other portions of said webs remaining relatively cool and of substantially full strength and forming transport means for said heated web portions.

5. A method according to claim 1 wherein containers are formed to project in like relation from said two continuous webs, and said formed containers are brought into nested relation and joined together to form double wall containers prior to the separation of said double wall containers from said two continous webs.

6. A method according to claim 5 wherein said containers have peripheral flanges surrounding open mouths thereof, and the joining together of nested containers is primarily between said flanges.

* * * * *